United States Patent [19]  [11] 3,875,093
Cooke et al.  [45] Apr. 1, 1975

[54] 1-SUBSTITUTED-6,7-METHYLENEDIOXY-QUINOZALIN-2(1H)-THIONES

[75] Inventors: George A. Cooke, Denville; William J. Houlihan, Mountain Lakes, both of N.J.

[73] Assignee: Sandoz-Wander, Inc., Hanover, N.J.

[22] Filed: Mar. 22, 1973

[21] Appl. No.: 343,817

Related U.S. Application Data

[63] Continuation of Ser. No. 141,011, May 6, 1971, abandoned.

[52] U.S. Cl. ........ 260/251 QB, 260/340.5, 424/251
[51] Int. Cl. ............................................ C07d 51/48
[58] Field of Search ............................. 260/251 QB

[56] References Cited
UNITED STATES PATENTS
3,748,342  7/1973  Cooke et al. ................. 260/332.3 P Primary Examiner—Donald G. Daus
Assistant Examiner—Raymond V. Rush
Attorney, Agent, or Firm—Gerald D. Sharkin; Richard E. Vila

[57] ABSTRACT 1-substituted-6,7-methylenedioxy-quinazolin-2(1H)-thiones are useful as intermediates for 1-substituted-4-aryl-6,7-methylenedioxy-quinazoline-2(1H)-thiones which are useful as anti-inflammatory agents.

2 Claims, No Drawings

1-SUBSTITUTED-6,7-METHYLENEDIOXY-QUINOZALIN-2(1H)-THIONES

This is a continuation, of application Ser. No. 141,011, filed May 6, 1971 and now abandoned.

This invention relates to 2(1H)-quinazolin-thiones and their preparation.

More particularly, this invention provides novel compounds of formula I,

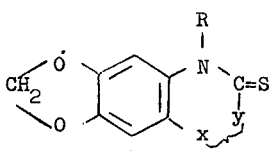   I in which

R signifies an alkyl radical of 1 to 5 carbon atoms, e.g., methyl, ethyl, isopropyl and t-butyl; cyclo(lower)alkyl of 3 to 6 carbon atoms, e.g., cyclopropyl and cyclohexyl; or cyclo(lower)alkyl(lower) straight chain alkyl of 4 to 7 total carbon atoms in which the cycloalkyl is of 3 to 6 carbon atoms and the straight chain alkyl is of 1 to 3 carbon atoms, e.g., cyclopropylmethyl; and $x\widehat{\phantom{x}}y$ signifies a group $$\begin{matrix} \diagdown \diagup \\ C=N \\ | \\ R_1 \end{matrix} \quad \text{or} \quad \begin{matrix} \diagdown \diagup \\ CH-NH \\ | \\ R_1 \end{matrix}$$

in which $R_1$ signifies a radical of formula II,

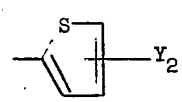   II or of formula III,

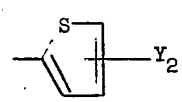   III in which either Y and $Y_1$ are the same or different and signify a hydrogen, fluorine or chlorine atom, an alkyl or alkoxy radical of 1 to 3 carbon atoms, or a trifluoromethyl group, provided that no more than one of Y and $Y_1$ signifies a trifluoromethyl group, or Y and $Y_1$ are on adjacent carbon atoms and together-signify a methylenedioxy group, and $Y_2$ signifies a hydrogen, fluorine or chlorine atom, or an alkyl radical of 1 to 3 carbon atoms.

The invention also provides processes for the production of compounds of formula I characterized by a. producing a compound of formula Ia,

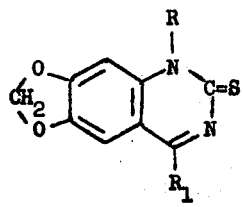   Ia in which R and $R_1$ are as defined above, by oxidizing a compound of the formula Ib

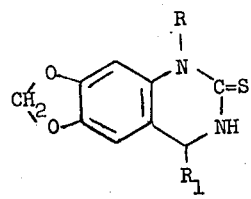   Ib in which R and $R_1$ are as defined above, under substantially anhydrous conditions b. producing a compound of formula Ib,

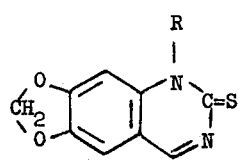   IV in which R is as defined above with a compound of formula V, $R_1' \ Q$   IX in which $R_1$ is as defined above, and Q signifies a lithium atom or a radical —MgX'', in which X'' signifies a chlorine or bromine atom, in the presence of an organic solvent which is inert under the reaction conditions, and hydrolyzing the resulting product.

Process (b) is preferably carried out at a controlled temperature of from −40° to +50°C., preferably +15° to +35°C., and usually most conveniently at about room temperature (20°C.). The organic solvent which is inert under the reaction conditions is preferably an organic acyclic or cyclic ether such as diethyl ether, dimethoxyethane, tetrahydrofuran, or dioxane or a mixture of such ethers, more preferably a cyclic ether such as tetrahydrofuran. The mole ratio of the compound of formula V to the compound of formula IV is not particularly critical. In the more preferred forms of practice an excess of the magnesium halide or lithium compound is employed typically to provide a ratio of from about 3:1 to 30:1, more preferably from 5:1 to 20:1. Lithium compounds of formula IX are preferred. The reaction time may for example range from 15 minutes to 5 hours. The reaction is desirably conducted under anhydrous conditions and followed by hydrolysis in manner known per se. The hydrolysis may for example be effected by addition of water to the resulting reaction mixture.

This process is of particular interest because it efficiently produces the compound Ib in spite of the presence in the starting compounds of formula IV of a thionyl function with which the aryl magnesium halide or aryl lithium compound of formula V would normally be expected to react under the conditions employed.

Process (a) is conveniently carried out at temperatures in the range of 0° to 150°C., with 20° to 60°C.

being preferred. Any oxidizing agent suitable for converting an organic amino moiety to an imino moiety can be used, for example, alkali metal permanganates, mercuric acetate and preferably manganese dioxide which has been maintained free of moisture. Solvents which can be used include aromatic solvents such as benzene and toluene as well as other inert organic solvents such as methylene chloride and acyclic or cyclic ethers, e.g., dioxane.

The compounds of formula IV, employed as starting materials in process (b), may be produced reacting a compound of formula VI,

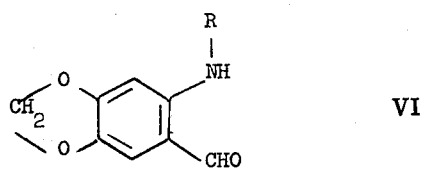   VI in which R is as defined above, with thiourea at an elevated temperature.

The reaction is most suitably effected at a temperature of from 50° to 250°C., preferably 100° to 200°C. The reaction is conveniently carried out in the absence of a solvent in an inert atmosphere such as nitrogen gas. The reaction may also be carried out in an organic solvent which is inert under the reaction condtions, for example, an aromatic solvent such as benzene or toluene.

The compounds of the formula VI used for producing compounds of the formula IV may be produced in manner known, for example, by reducing a compound of the formula VII, hereinafter, with a suitable catalyst, e.g., Raney Nickel/aluminum alloy, in the presence of an acid, e.g., formic acid, at elevated temperatures suitably in the range of 40° to 100°C., and in a suitable liquid medium which may be provided by employing an excess of the acid.

The compound of formula VII is

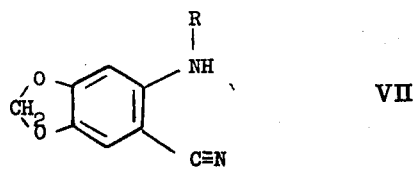   VII in which R is as defined above.

The compounds of formula VII used for producing compounds of formula VI as described above, may be produced in manner known per se by tolsylation, alkylation and detosylation of a compound of formula VIII,

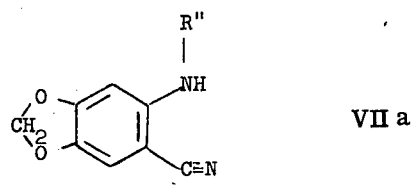   VIII

Compounds of formula VIIa

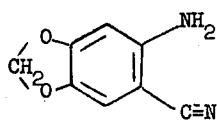

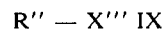

VII a in which R'' signifies cycloalkyl or a branched alkyl of 3 to 5 carbon atoms in which the branching occurs on the carbon atom adjacent to the nitrogen atom, are, however, preferably produced by reacting a compound of formula VIII, above, with a compound of formula IX,

R'' — X''' IX in which R'' is as defined and X''' is bromo or iodo, preferably iodo.

The reaction is desirably carried out in the presence of a base, preferably an inorganic base, such as an alkali metal carbonate, to take up the hydrogoen halide liberated during the reaction. The reaction may be effected in an organic solvent which is inert under the reaction conditions, e.g., dioxane, benzene and toluene. However, the use of a solvent is not necessary and a substantial excess of the compound of formula IX is preferably employed to provide the solvent medium. The reaction is suitably carried out at an elevated temperature which is not especially critical but preferably lies in the range of from 60° to 140°C., more preferably 70° to 110°C.

The compound of formula VIII is known (J. Am. Chem. Soc. 70, 1901(1948) ).

Unless otherwise indicated, the various intermediate products described herein, may be isolated and purified using conventional techniques.

The compounds of formula I possess pharmaceutical activity in animals. In particular, the compounds are useful as anti-inflammatory agents as indicated by the Carrageenan-induced edema test in rats. For such use, the compounds may be combined with a pharmaceutically acceptable carrier, and other conventional adjuvants, and preferably administered orally in such forms as tablets, capsules, elixirs, suspensions and the like. For the above-mentioned use, the dosage administered will vary depending upon known factors such as the particular compound used and mode of administration. However, in general, the compounds of formula Ia provide satisfactory results when administered at a daily dose of from about 0.2 to 180 milligrams per kilogram of body weight, preferably given in divided doses 2 to 4 times a day, with daily dosage for large mammals ranging from between about 16 to 1,500 milligrams and individual doses between 4 to 750 milligrams. The compounds of formula Ib, in general, provide satisfactory results when administered at a daily dose of from about 3 to 250 milligrams per kilogram of body weight, preferably given in divided doses, with daily dose for large mammals ranging between about 200 to 2500 milligrams and individual doses ranging between 50 to 1,250 milligrams.

The compounds of the formula I, particularly Ia, are also useful as analgesics, as indicated by application of pressure to yeast-inflamed foot of the rat (oral administration), and as anti-pyretics as indicated by inhibition of yeast-induced fever in rats (oral administration). For such uses, the compounds may be administered in modes and forms similar to those employed in the treatment of inflammation and at dosages indicated above as applicable for the use of the compound in the treatment of inflammation.

The compounds may be administered orally in such forms as tablets, dispersible powders, granules, capsules, elixirs, suspensions and syrups, or parenterally in the form of an injectable solution or suspension. Such compositions may be prepared according to any method known in the art for the manufacture of pharmaceutical compositions, and such compositions may contain one or more conventional adjuvants, such as sweetening agents, flavouring agents, colouring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient along or admixed with an inert solid diluent, e.g., calcium carbonate, calcium phosphate and kaolin. The preferred pharmaceutical compositions from the stand-point of preparation and ease of administration are solid compositions, particularly hard-filled capsules and tablets.

A representative formulation is a capsule prepared by conventional techniques and containing the following ingredients:

| Ingredient | Parts by Weight |
| --- | --- |
| Compound of formula I, e.g. 1-isopropyl-4-phenyl-6,7-methylenedioxy-2(1H)-quinazolinthione | 50 |
| Inert solid diluent e.g. kaolin | 200 |

Preferred compounds of formula I from the point of view of pharmacological activity, are the compounds of formula Ia, particularly those in which R signifies an isopropyl radical, for example, 1-isopropyl-4-phenyl-6,7-methylenedixoy-2(1H)-quinazolinthione.

As used herein, the expression "in manner known per se" means methods in use or described in the literature on the subject.

The following examples illustrate the invention. Unless otherwise stated, percentages are by weight and temperatures are in degrees Centigrade.

EXAMPLE 1

Process (a)

1-Isopropyl-4-phenyl-6,7-methylenedioxy-2(1H)-quinazolinthione

A mixture of 2 grams of 1-isopropyl-4-phenyl-6,7-methylenedioxy-3,4-dihydro-2(1H)-quinazolinthione, 100 ml. of methylene chloride and 4 grams of manganese dioxide is stirred for 48 hours at room temperature. Precipitated solids are removed by filtration and the filtrate evaporoated to dryness. The residue is recrystallized from ethyl acetate and then methanol and then eluted with benzene in a silica gel column to give 1-isopropyl-4-phenyl-6,7-methylenedioxy-2(1H)-quinazolinthione, m.p. 202°–205°C.

Other compounds I are:

1-isopropyl-4-(m-fluorophenyl)-6,7-methylenedioxy-3,4-dihydro-2(1H)-quinazolinthione, m.p. 200°–203°C.

1-isopropyl-4-(m-fluorophenyl)-6,7-methylenedioxy-2-(1H-quinazolinthione, m.p. 210°–214°C.

1-isopropyl-4-(p-isopropylphenyl)-6,7-methylenedioxy-3,4-dihydro-2(1H)-quinazolinthione, m.p. 155°–157°C.

1-isopropyl-4-(p-isopropylphenyl)-6,7-methylenedioxy-2(1H)-quinazolinthione, m.p. 167°–170°C.

1-isopropyl-4-(p-fluorophenyl)-6,7-methylenedioxy-3,4-dihydro-2(1H)-quinazolinthione, m.p. 198°–199°C.

1-isopropyl-4-(p-fluorophenyl)-6,7-methylenedioxy-2(1H)-quinazolinthione, m.p. 220°–223°C.

We claim:

1. A compound of the formula

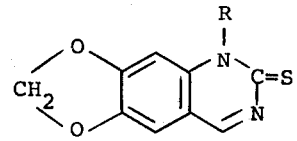

wherein
R is alkyl of 1 to 5 carbon atoms, cycloalkyl of 3 to 6 carbon atoms or cycloalkylalkyl of 4 to 7 total carbon atoms in which cycloalkyl is of 3 to 6 carbon atoms and alkyl is of 1 to 3 carbon atoms.

2. A compound according to claim 1 wherein R is alkyl of 1 to 5 carbon atoms.

* * * * *